United States Patent
Billaud (10) Patent No.: US 11,086,006 B2
(45) Date of Patent: Aug. 10, 2021

(54) METHOD FOR MEASURING ANTENNA PATTERNS OF A SECONDARY RADAR AND SECONDARY RADAR IMPLEMENTING SUCH A METHOD

(71) Applicant: THALES, Courbevoie (FR)

(72) Inventor: Philippe Billaud, Limours (FR)

(73) Assignee: THALES, Courbevoie (FR)

( * ) Notice: Subject to any disclaimer, the term of this patent is extended or adjusted under 35 U.S.C. 154(b) by 316 days.

(21) Appl. No.: 16/203,527

(22) Filed: Nov. 28, 2018

(65) Prior Publication Data

US 2019/0187271 A1 Jun. 20, 2019

(30) Foreign Application Priority Data

Dec. 19, 2017 (FR) ...................................... 1701322

(51) Int. Cl.
| | |
|---|---|
| *G01S 13/78* | (2006.01) |
| *G01S 13/91* | (2006.01) |
| *G01S 13/87* | (2006.01) |
| *G01S 13/76* | (2006.01) |
| *G01S 7/41* | (2006.01) |
| *G01S 7/40* | (2006.01) |

(52) U.S. Cl.
CPC .............. *G01S 13/781* (2013.01); *G01S 7/41* (2013.01); *G01S 13/762* (2013.01); *G01S 13/78* (2013.01); *G01S 13/872* (2013.01); *G01S 13/91* (2013.01); *G01S 7/403* (2021.05); *G01S 7/4034* (2021.05)

(58) Field of Classification Search
CPC .......... G01S 13/78; G01S 13/781; G01S 7/41; G01S 13/762; G01S 13/872; G01S 13/91
See application file for complete search history.

(56) References Cited

U.S. PATENT DOCUMENTS

| | | | | |
|---|---|---|---|---|
| 3,772,688 A | * | 11/1973 | Smit .................. | G01S 13/78 342/43 |
| 4,021,802 A | * | 5/1977 | Litchford .............. | G01S 13/781 342/32 |
| 4,034,371 A | * | 7/1977 | Maier ..................... | G01S 13/22 342/43 |
| 4,099,180 A | * | 7/1978 | Kupersmith ............ | G01S 13/78 342/42 |

(Continued)

FOREIGN PATENT DOCUMENTS

| | | |
|---|---|---|
| EP | 0 389 343 A1 | 9/1990 |
| EP | 0 506 527 A1 | 9/1992 |

(Continued)

*Primary Examiner* — Peter M Bythrow
(74) *Attorney, Agent, or Firm* — BakerHostetler (57) ABSTRACT

An each pattern is provided a reception pathway, the method uses the synchronous replies and the asynchronous replies, unsolicited of Fruit type, transmitted by targets present in the aerial environment of the radar and detected over a given number of antenna revolutions. At each detection of a reply the value of its off-aim in bearing and the value of relative power received on each of the pathways are calculated as is its elevation by extrapolation with the synchronous detections close to the same target and associated with the detection. The values obtained over the given number of revolutions are stored, the measured patterns being sampled on the basis of the stored values.

11 Claims, 9 Drawing Sheets

(56) References Cited

U.S. PATENT DOCUMENTS

| | | | | |
|---|---|---|---|---|
| 4,109,248 | A | * | 8/1978 | Knowles ............... G01S 13/762 342/40 |
| 4,656,477 | A | * | 4/1987 | Ronconi ............... G01S 13/762 342/37 |
| 4,789,865 | A | * | 12/1988 | Litchford ............. G01S 13/933 342/455 |
| 5,075,694 | A | * | 12/1991 | Donnangelo ........ G01S 13/933 342/455 |
| 5,081,457 | A | * | 1/1992 | Motisher ............... G01S 13/781 342/40 |
| 5,198,821 | A | * | 3/1993 | Skrzypczak ........... G01R 29/10 342/360 |
| 5,262,784 | A | * | 11/1993 | Drobnicki ............... G01S 13/91 342/45 |
| 5,463,398 | A | * | 10/1995 | Young ................... G01S 13/762 342/30 |
| 6,337,652 | B1 | * | 1/2002 | Shiomi ................. G01S 13/781 342/37 |
| 8,253,622 | B2 | * | 8/2012 | Hampel ................ G01S 13/781 342/147 |
| 8,362,943 | B2 | * | 1/2013 | Jacobs .................... G01S 13/91 342/29 |
| 8,462,041 | B2 | * | 6/2013 | Hampel ................ G01S 13/765 342/32 |
| 9,869,745 | B1 | * | 1/2018 | Rowlan .................. G01S 13/74 |
| 2005/0024256 | A1 | * | 2/2005 | Ridderheim ......... G08G 5/0078 342/29 |
| 2007/0252750 | A1 | * | 11/2007 | Jean ...................... G01S 13/784 342/40 |
| 2008/0042896 | A1 | * | 2/2008 | Alon ................... G01S 13/4418 342/174 |
| 2008/0238758 | A1 | * | 10/2008 | Billaud ................. G01S 13/782 342/32 |
| 2009/0109085 | A1 | * | 4/2009 | Needham ................. H01Q 1/28 342/174 |
| 2010/0026553 | A1 | * | 2/2010 | Billaud ................. G01S 13/782 342/37 |
| 2010/0289689 | A1 | * | 11/2010 | Kuji ..................... G01S 13/782 342/37 |
| 2011/0001659 | A1 | * | 1/2011 | Hampel ..................... G01S 3/74 342/120 |
| 2011/0128180 | A1 | * | 6/2011 | Fiori ..................... G01S 13/782 342/93 |
| 2012/0001793 | A1 | * | 1/2012 | Jacobs ................. G01S 7/4004 342/146 |
| 2013/0282319 | A1 | * | 10/2013 | De Marco ................ H04B 1/10 702/79 |

FOREIGN PATENT DOCUMENTS

| | | |
|---|---|---|
| EP | 3 076 199 A1 | 10/2016 |
| GB | 2 194 407 A | 3/1988 |

* cited by examiner

METHOD FOR MEASURING ANTENNA PATTERNS OF A SECONDARY RADAR AND SECONDARY RADAR IMPLEMENTING SUCH A METHOD

CROSS-REFERENCE TO RELATED APPLICATIONS

This application claims priority to foreign French patent application No. FR 1701322, filed on Dec. 19, 2017, the disclosure of which is incorporated by reference in its entirety.

FIELD OF THE INVENTION

The present invention relates to a method for measuring antenna patterns of a secondary radar. It also relates to a secondary radar implementing such a method.

The field of the invention is, in particular, Air Traffic Control (ATC) for which the performance of the radar is fundamental both at the level of the detection of aircraft, with an objective approaching 100%, and of the very low false detection rate, with an objective approaching 0%.

The invention also finds its place in the military field (IFF) for which the performance of the radar is just as fundamental for the identification "friend or foe" of aircraft.

BACKGROUND

In both applications, performance is particularly related to the quality of the patterns of the antenna, antenna of LVA ("Large Vertical Aperture") type or of boom type, fitted to the radar employed for ATC or for IFF.

Currently, measurement of quality of the patterns on an antenna installed on a radar site requires at one and the same time:
- that the station be undergoing maintenance, thereby decreasing the radar coverage at the system level;
- that an external rig be employed to measure, while transmitting (1030 MHz), the three patterns (sometimes two or four patterns) of the antenna sum (SUM), control (CONT) and difference (DIFF).

It should be noted that the measurements while transmitting are performed only for the value of elevation of the rig, at a very low value of elevation often close to zero whilst aircraft are situated mainly between 0.5° and 20°, depending on the type of employment of the radar ("airport" or "EnRoute" configuration).

Between the preventive periodic measurements of the antenna patterns, their degradation is then perceived by the users only when the performance of the radar is degraded sometimes to the point of no longer fulfilling its mission. In this case, service interruption is then imposed temporally and the repair of the antenna has to be performed as a matter of urgency knowing that this is the most important and complicated maintenance task for a radar.

Effective maintenance of radar antennas is therefore a real technical requirement to be solved.

SUMMARY OF THE INVENTION

An aim of the invention is in particular to solve this problem. For this purpose, the subject of the invention is a method for measuring the antenna patterns in bearing of a secondary radar per elevation slice, each pattern being associated with a reception pathway, the said method using the synchronous replies and the asynchronous replies, unsolicited of Fruit type, transmitted by targets present in the aerial environment of the said radar and detected over a given number of antenna revolutions, at each detection of a reply, the time of the said detection, the value of the azimuth of the main beam of the antenna and the value of power received on each of the said pathways being associated with the said detection, each asynchronous reply being enriched with its bearing, with its relative power per pattern and with its elevation by differencing with the same values of the said synchronous reply, extrapolated to the time of the Fruit, the said values obtained over the given number of revolutions being stored, the measured patterns being sampled on the basis of the said stored values.

In a particular mode of implementation, for each asynchronous reply of a target, the following are calculated:
- its antenna bearing: by extrapolation of the synchronous position of the said target azimuth-wise to the Fruit detection time and of the position of the antenna azimuth-wise to the Fruit detection time;
- its relative power: by extrapolation of the power of the said synchronous replies, acquired with the main beam of the sum pathway of the antenna, of the said target temporally bracketing the Fruit detection time to the time of the Fruit and of the power of the Fruit on each of the patterns of the antenna;
- its elevation: by extrapolation of the elevation, received in the synchronous replies, of the said target temporally bracketing the Fruit detection time to the time of the Fruit.

The said antenna comprises for example one of the sets of patterns following:
- a sum pattern (SUM), a difference pattern (DIFF), a control pattern for rejecting replies of targets facing the antenna (CONT_Front) and a control pattern for rejecting targets to the rear of the antenna (CONT_Back);
- a sum pattern (SUM), a difference pattern (DIFF), a control pattern (CONT);
- a sum pattern (SUM) and a difference and control pattern (DIFF/CONT).

The replies of Fruit type and the synchronous replies are for example enriched by characteristics representative of the acquisition of the said replies, the said characteristics being for each reply at least one of the following characteristics:
- power received according to each pattern of the said antenna;
- time of the detection of the said reply;
- azimuth of the main beam of the said antenna during the said detection.

The detection of a reply of Fruit type is for example enriched by information obtained on the basis of the synchronous replies obtained during the revolutions surrounding the revolution of detection of the said reply of Fruit type, this information being one at least of the following characteristics:
- relative power of the said reply of Fruit type;
- bearing of the said reply of Fruit type;
- elevation of the said reply of Fruit type.

Over the given number of revolutions, the relative power of a Fruit-type or synchronous reply as a function of the power of the target on the sum pattern are accumulated for example in tables with two entries, a table being associated with each antenna pattern, one entry being the bearing as a function of the axis of the main lobe of the antenna and one entry being the elevation of the target as a function of the horizontality of the antenna. For each cell (bearing, elevation) of each pattern the most probable relative power is established by schemes of the mean, histogram or other type.

The given number of revolutions is for example defined so as to reveal ongoing degradations of the said patterns.

The antenna can equally well be intended for ATC applications as for IFF applications. It comprises for example at least two antenna patterns.

It can be fixed or rotating. It can also be an electronically scanned antenna.

Advantageously, the measurement of the said patterns is used to verify the level of degradation of the said patterns.

The subject of the invention is also a secondary radar implementing such a method.

BRIEF DESCRIPTION OF THE DRAWINGS

Other characteristics and advantages of the invention will become apparent with the aid of the description which follows, given with regard to appended drawings which represent.

DETAILED DESCRIPTION

Figure 1:
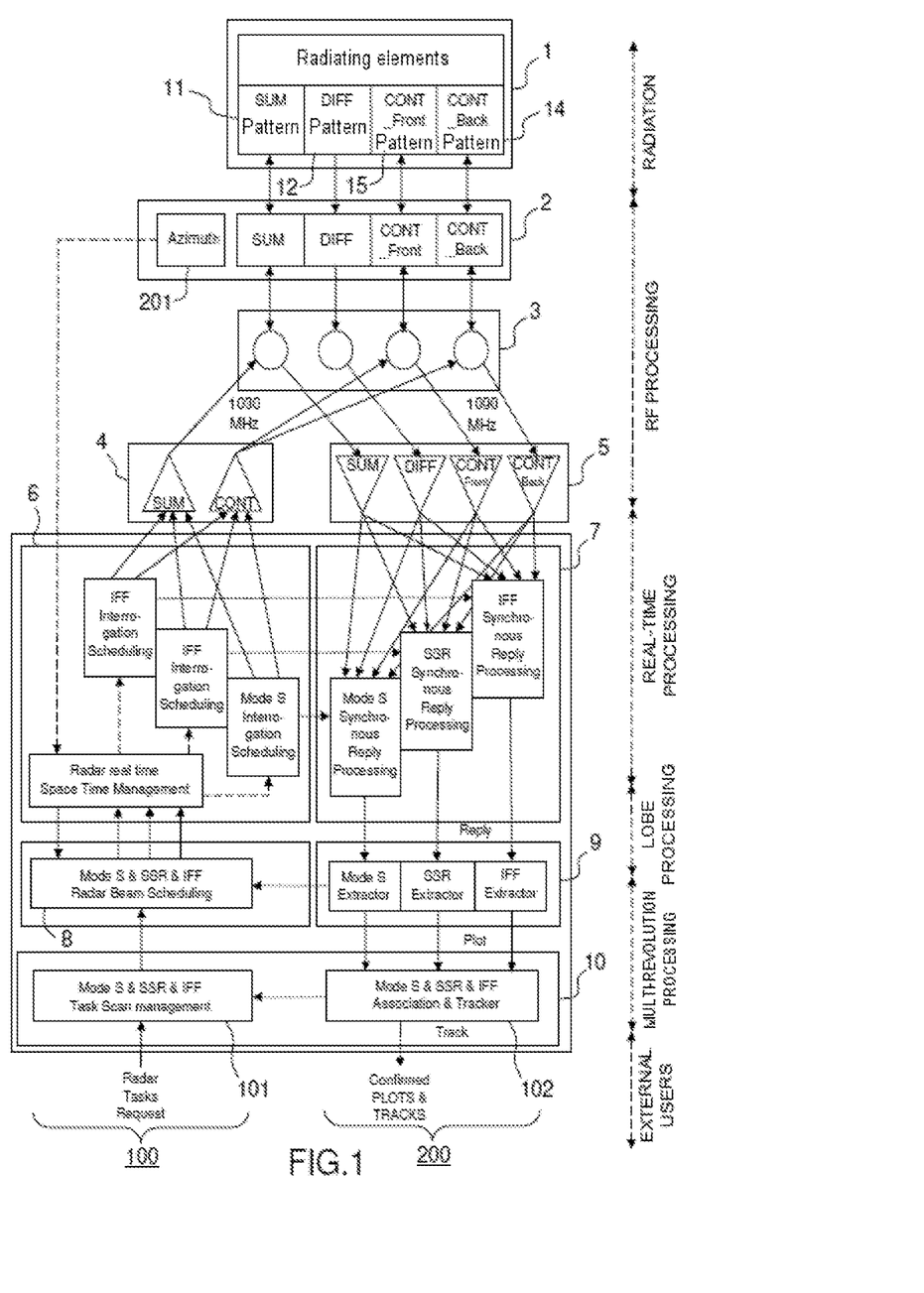
FIG. 1, an exemplary schematic of a Mode S secondary radar.

With regard to FIG. 1 which represents an exemplary schematic of a Mode S radar, the principles of such a radar are recalled.

The principle of the mode S secondary radar (defined in detail by ICAO Annexe 10 vol. 4) consists in:
transmitting selective interrogations:
  either indicating the recipient: a single target designated by its Mode S address;
  or indicating the identifier of the transmitter;
receiving selective replies:
  either indicating the identifier of the transmitter: the same Mode S address of the target;
  or indicating the recipient: the identifier of the interrogator.

When employed in its usual manner, the secondary radar operates in synchronous mode, that is to say that it transmits an interrogation and waits for a reply in coherence with the latter, thereby allowing it to locate by measurement (azimuthal and distance) and to identify (through the mode S address) the target.

To perform this task with effect, the radar is equipped with an antenna 1 having several patterns 11, 12, 14, 15 whose roles are conventionally:
  a sum pattern 11, denoted hereinafter SUM, to interrogate and detect the synchronous reply of the target;
  a difference pattern 12, denoted DIFF, to finely locate the target in the SUM beam;
  a first control pattern 15, denoted CONT_front, to block and reject the replies arising from targets facing the antenna that are not present in the SUM beam;
  a second control pattern 14, denoted CONT_back, to block and reject the replies arising from targets with their back to the antenna (and which therefore are necessarily not present in the SUM beam).

According to the missions and therefore the expected performance of the radar the antennas may have:
  several patterns:
    4 patterns: SUM, DIFF, CONT_Front & CONT_Back;
    3 patterns: SUM, DIFF, CONT (CONT_Front and CONT_Back are grouped together at the antenna level);
    2 patterns: SUM, DIFF/CONT (DIFF, CONT_Front & CONT_Back are grouped together at the antenna level);
  different dimensions:
    width-wise:
      having a large width so as to have a fine main beam affording a large gain and also so as to be selective and precise azimuth-wise;
    height-wise:
      having a large height, of Large Vertical Aperture (LVA) type affording some gain and protection against ground reflections (mainly for ATC);
      having a small height, of "boom" type, affording mobility (mainly for IFF).

Whilst the SUM and DIFF patterns are conventionally fine with lobes at 3 dB between 2.4° to 10°, the CONT_Front and CONT_Back patterns seek to each cover practically 180°.

The antennas can also be:
  fixed-pattern, so-called "mechanical" and rotating antennas;
  alterable-pattern, fixed or rotating, so-called "AESA" electronically scanned antennas.

In its operational use, the radar receives unsolicited replies (without associated interrogation on its part), the latter are named "False Reply Unsynchronized in Time" or Fruit. They are so-named because:
  they are not expected by the radar which rejects them ("False");
  they are very similar replies to the synchronous ones arising from the same targets in the same coverage of the radar, having the same frequency and the same message format ("Reply");
  they are not associated with an interrogation of this radar, but with that of another radar or even one transmitted by the target in a periodic manner such as ADS-B_out squitters ("Unsynchronized in Time").

On account of their asynchronous characteristic the Fruits are received by the radar on all its antenna patterns.

Finally, the Mode S Fruits are all identifiable by the unique Mode S address associated with each target.

Whilst the Fruits generated by a secondary radar are currently processed as defects which must be filtered before processing, the invention advantageously utilizes these Fruits in the course of the processing to measure the antenna patterns.

As will be described hereinafter, the principle of the invention therefore consists in utilizing the Mode S Fruits to permanently measure the patterns of the antennas of secondary radars. This employing of the Fruits to measure the antenna patterns continuously is an opportunistic and judicious utilization of the presence of aircraft and to a lesser extent of interrogators in the detection environment.

Advantageously, this utilization has no influence on the functional operation of the radars, regardless of the type of the antennas described hereinabove. It does not require any RF transmission additional to the operational task of the radar it therefore does not pollute the 1030/1090 MHz RF environment.

Before describing the invention in greater detail, the constituent elements of the Mode S radar of FIG. 1 are described. The schematic depicts the synchronous operation of the Mode S radar:
- on the left part 100 by the generation of the interrogations;
- on the right part 200 by the synchronous processing of the associated replies, as well as the synchronizations between the latter by the transverse arrows between left and right.

The functions of the main elements are recalled hereinafter:

The antenna 1 ensures the radiation of the interrogations at 1030 MHz and of the replies returned at 1090 MHz, according to the four patterns: SUM, DIFF, CONT_Front and CONT_Back, or according to two patterns (SUM, DIFF/CONT) or three patterns (SUM, DIFF, CONT).

A rotating joint 2 and antenna drop cables ensure:
- RF coupling of the signals transmitted at 1030 MHz and received at 1090 MHz independently for the four patterns between the rotating part and the fixed part of the radar;
- the broadcasting of the azimuthal position 201 of the axis of the main lobe of the antenna.

RF processing comprises:
- a duplexer or circulator 3 ensuring RF coupling between the signals transmitted at 1030 MHz and received at 1090 MHz independently for the four patterns;
- a transmitter 4 ensuring:
  - the transmission of the interrogations at 1030 MHz on the SUM pattern;
  - the blocking of the transponders outside of the SUM lobe at 1030 MHz by
  - the CONT_Front and CONT_Back patterns;
  - doing so for the various secondary protocols: IFF, SSR and Mode S;
- a receiver 5 ensuring the reception of the replies at 1090 MHz on the four patterns SUM, DIFF, CONT_Front and CONT_Back, for the various secondary protocols: IFF, SSR and Mode S.

Real-time processing comprises:
- spatio-temporal management 6 ensuring the real-time management of the interrogation periods and associated listening periods for the various secondary protocols: IFF, SSR and Mode S,
- signal processing 7 ensuring:
  - the processing of the replies in the listening periods associated with the interrogations for the various secondary protocols: IFF, SSR and Mode S;
  - the detection and the decoding of the Synchronous replies in the main lobe of the antenna by utilizing the four patterns:
    - SUM: to detect the replies received in the main lobe;
    - DIFF: to finely locate in azimuth the replies received in the SUM main lobe and optionally for detection;
    - CONT_Front and CONT_Back: to reject the replies received on the SUM and DIFF sidelobes in the case of a detection in the DIFF main lobe.

Processing in the main lobe of the antenna comprises:
management 8 of the targets present in the lobe, ensuring:
- the preparation of the transactions (interrogations and replies) to be performed in the next lobe for the various secondary protocols IFF, SSR and Mode S;
- the placement of the Mode S interrogations and replies in the future "Roll call" period as a function of the state of the transactions that have just been performed;

extractors 9 ensuring the construction of blips for each of the various secondary protocols IFF, SSR and Mode S, on the basis of the synchronous replies received in the lobe.

Multi-revolution processing 10 comprises:
- management 101 of the Mode S tasks to be performed with the targets in the coverage, ensuring the prediction of positions of the targets (antenna rendezvous) and the preparation of the tasks to be performed with these positions according to the external demands and the state of the transactions of the previous revolutions;
- association of the blips and tracking 102 of the targets in the coverage ensuring the tracking of the targets so as to improve performance (elimination of false blips, control of decoded data in particular) and to predict their future position.

An interface with the users allows the radar to take various requests into account and to view the blips and the pursuits of targets.

Figure 2:
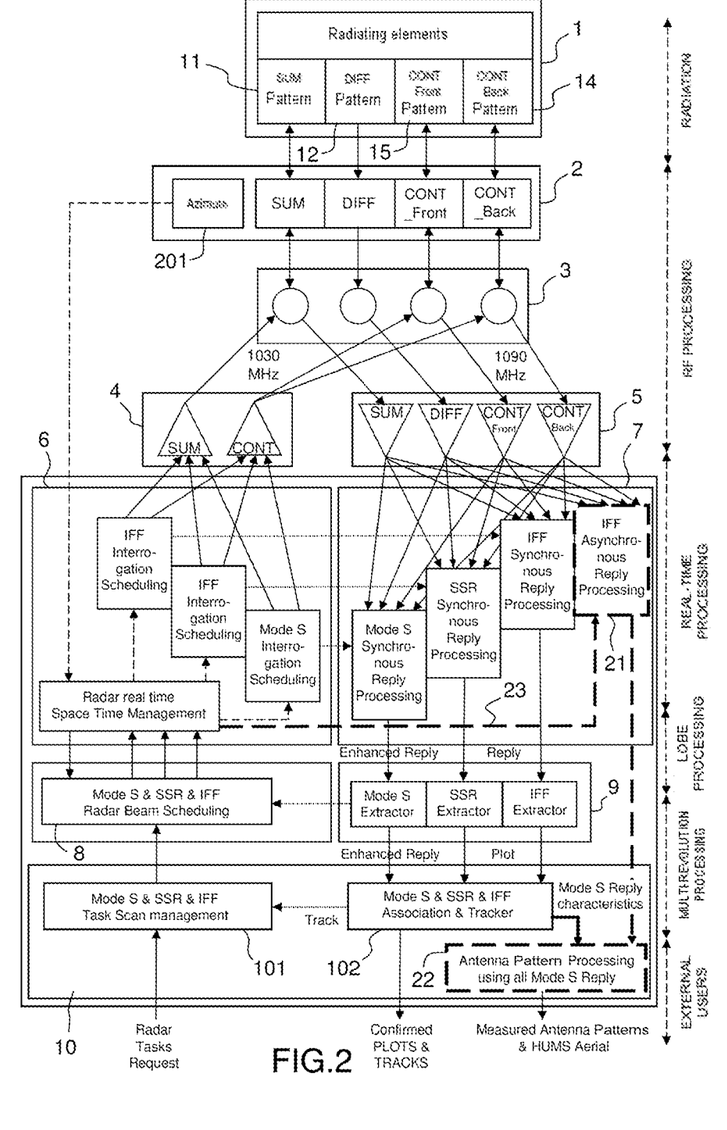
FIG. 2, an illustration of the hardware implementation of the method according to the invention on the radar of FIG. 1.
Figure 3A:
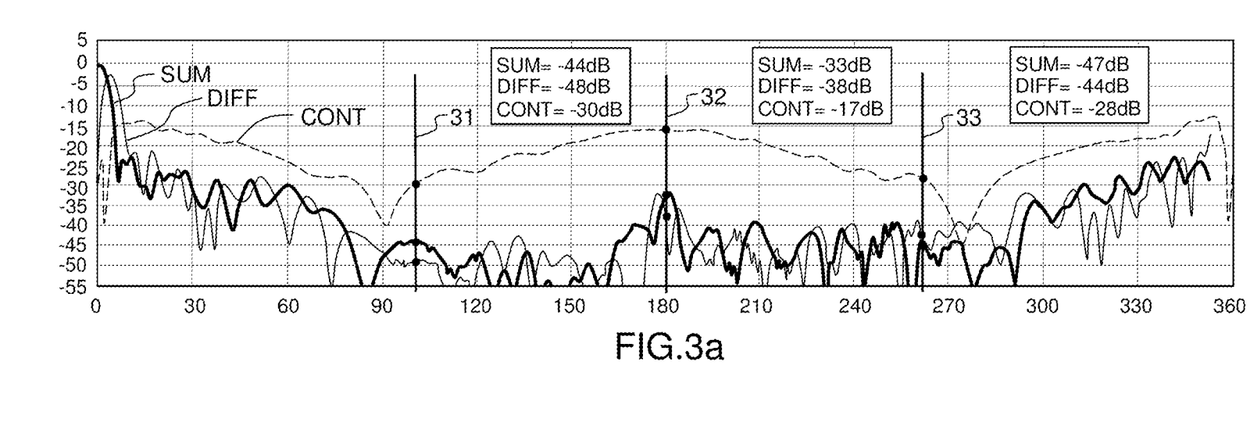
FIGS. 3a to 3f, a presentation, by way of example, of a sampling of antenna patterns by the Fruits of three targets.
Figure 3B:
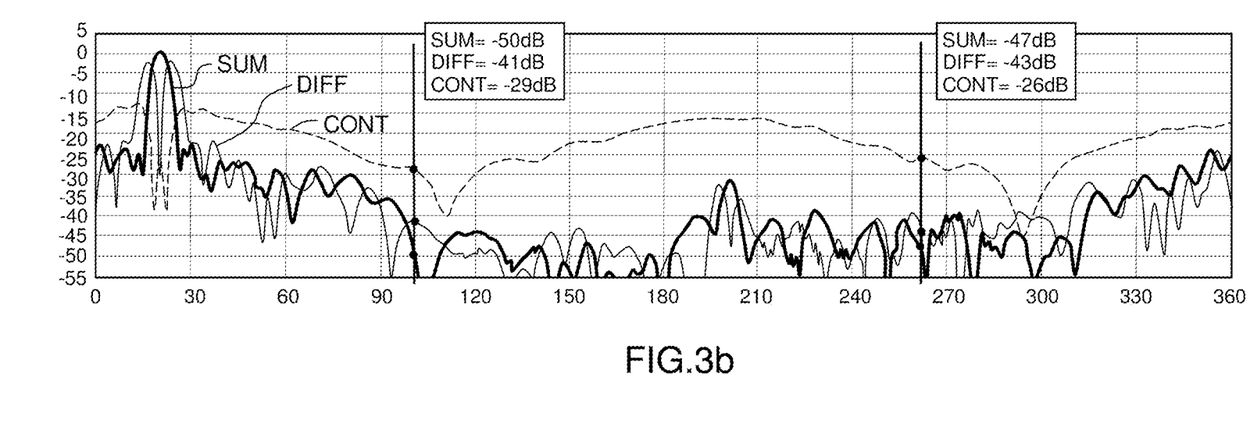
Figure 3C:
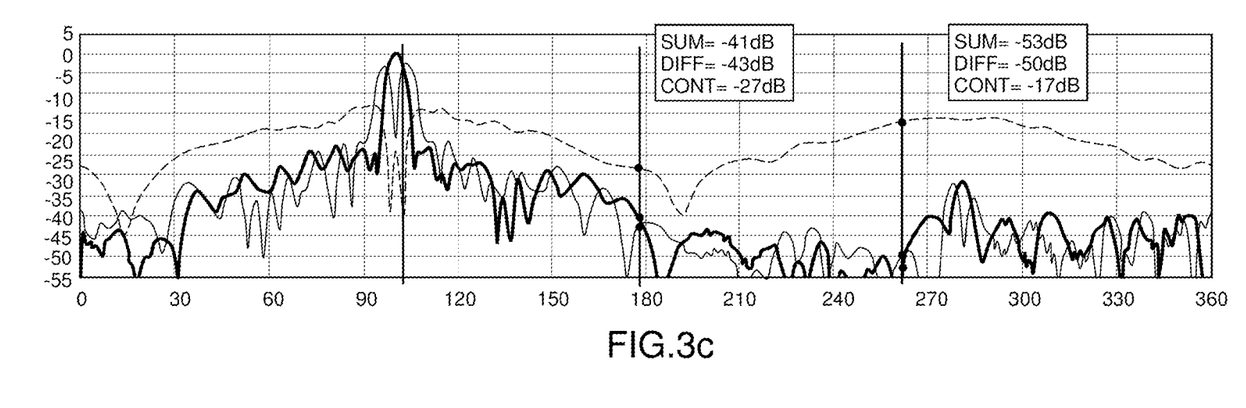
Figure 3D:
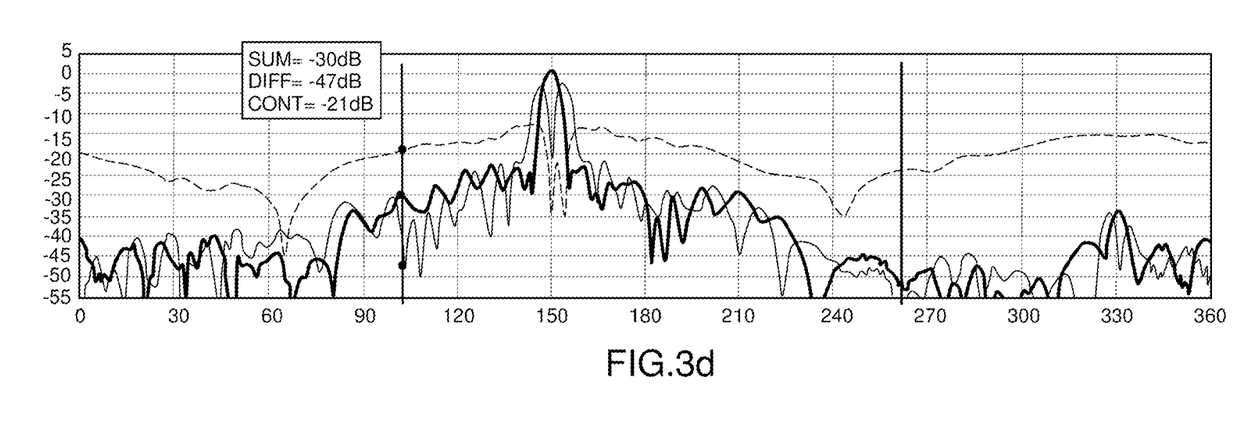
Figure 3E:
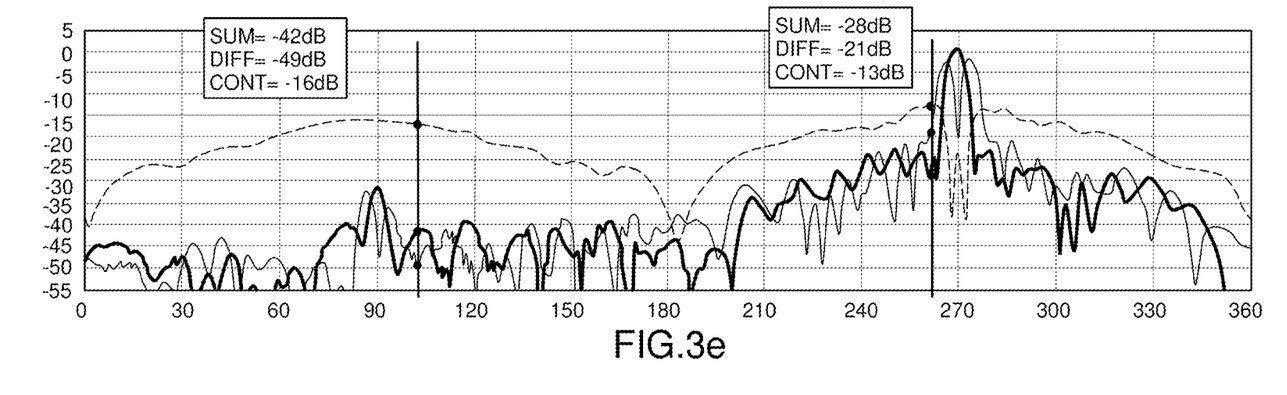
Figure 3F:
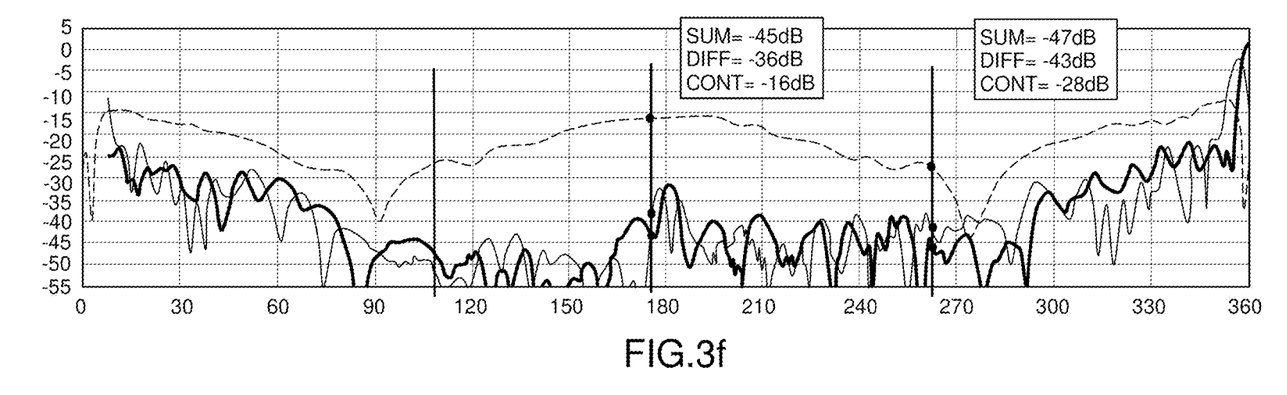

FIG. 2 illustrates the hardware implementation of the invention by presenting the schematic of the radar of FIG. 1, augmented with the elements specific to the invention. The main elements of the invention which are applied to the Mode S radar are represented by bold dashes in FIG. 2.

Whilst the operation of a Mode S radar is synchronous, it is seen that the added processings 21, 22 are not transmit-related and utilize only the azimuthal position of the axis of the main lobe of the antenna 23.

Most of the elements remain unchanged, thereby verifying in particular the non-intrusion of the invention into the functional operation of the Mode S radar.

A first added processing 21 is a permanent processing of the asynchronous replies in Mode S (independently of the listening periods associated with the interrogations), this processing 21 ensures the detection and the decoding of the asynchronous replies by utilizing separately but equally the four antenna patterns: SUM, DIFF, CONT_Front and CONT_Back to:
- detect all the replies received, asynchronous and synchronous;
- decode the ungarbled replies so as to extract therefrom the Mode S address, to enrich each decoded reply with its characteristics, in particular the detection time, the azimuth of the main lobe of the antenna during detection, the power received in the SUM, DIFF, CONT_Front and CONT_Back patterns.

For this purpose, the spatio-temporal management 6 transmits the azimuthal position 23 of the main lobe of the antenna to the permanent processing 21 of the Mode S asynchronous replies.

An enrichment of the synchronous replies by the powers measured on the SUM, DIFF, CONT_Front and CONT_Back patterns is, advantageously, obtained in parallel.

At the level of the extractors 9, an enrichment of the Mode S blips with their synchronous replies is also obtained, with for each reply the power measured on SUM, DIFF, CONT_Front and CONT_Back and the antenna azimuth.

A second added element 22 is a processing of the antenna patterns which ensures the calculation of the antenna patterns in elevation on the basis of the synchronous replies (of all the modes) and asynchronous Mode S replies. This second processing is added in the multi-revolution processing where the association of the blips and a tracking 102 of the targets transmits the tracks with the Mode S address, time and position, supplemented with the replies enriched with the power measured on SUM, DIFF, CONT_Front and CONT_Back and the antenna azimuth.

A secondary radar, for example equipped with these complementary elements, is able to implement the method according to the invention. It cleverly uses the synchronous and asynchronous Mode S replies (in particular the Fruits including the ADS-B squitters) to sample the patterns of the antenna of the radar at all the bearings of the latter. Of course, the principle of employing Fruits to measure antenna patterns is possible only in the presence of aircraft, and to a lesser extent of interrogators, in the surrounding space, which is the case in practice.

FIGS. 3a to 3f present, by way of example, a sampling of the antenna patterns by the Fruits of three targets 31, 32, 33. The antenna patterns are represented in a system of axes where the abscissae represent the azimuths and where the ordinates represent the gains of the rotary antenna according to its various azimuthal positions during its rotation.

FIGS. 3a to 3f illustrate the previously described principle of the invention. Being received at any moment, the Fruits sample the antenna patterns at various bearings of the antenna. The invention advantageously utilizes this property.

More particularly, FIGS. 3a to 3f present the three patterns sum SUM, difference DIFF and control CONT at a given antenna revolution (antenna revolution N) at the various azimuths during the reception of Fruit, respectively 0°, 20°, 100°, 150°, 270°, and 360°, the azimuth 0° indicating the direction of North.

The three targets 31, 32, 33 situated at various azimuths generate a few Fruits during this revolution N:
- the first target 31 is to the East at the azimuth 100°, moving slightly with increasing azimuth;
- the second target 32 is to the South, at the azimuth 180° moving slightly with decreasing azimuth;
- the third target 33 is to the West, at the azimuth 260° with constant azimuth.

To simplify, in this example the Fruits arising from the targets are considered to be detected at the same time, therefore for exactly the same antenna azimuth but of course at different bearings of the antenna.

At each detection of a Fruit, the invention associates at one and the same time its off-aim in bearing and the relative power level received on each of the patterns.

Table 1 hereinbelow indicates, with regard to the example of FIGS. 3a to 3f, the antenna pattern values sampled by the Fruits of the three targets.

At the end of revolution N, these values are accumulated with the values acquired during the previous antenna revolutions, as a function of the bearing, such as is presented in table 2 hereinbelow, regardless of which target generated the Fruits (or by selecting certain targets according to criteria relating to power, to azimuth, . . . ).

In this table, the values "after" revolution N do not yet exist (for revolution N+1). The values "before" revolution N are different for each bearing, this being expressed by the notation Xx, Yy and Zz. In this table 2, the measurements arising from the first target are in normal characters, the measurements arising from the second target are in bold and the measurements arising from the third target are in italic characters.

TABLE 2

| Bearing | SUM | | | DIFF | | | CONT | | |
|---|---|---|---|---|---|---|---|---|---|
| scan | before | N | after | before | N | after | before | N | after |
| −168 | Xx1 | −42 | | Xx2 | −49 | | Xx3 | −16 | |
| +240/−120 | Yy1 | −47 | | Yy2 | −43 | | Yy3 | −26 | |
| +260/−100 | Zz1 | −47 | | Zz2 | −44 | | Zz3 | −28 | |
| −99 | Tt1 | −47 | | Tt2 | −43 | | Tt3 | −28 | |
| −50 | Uu1 | −30 | | Uu2 | −47 | | Uu3 | −21 | |
| −10 | Vv1 | −28 | | Vv2 | −21 | | Vv3 | −13 | |
| Main beam | Synch | Synch | . | Synch | Synch | . | Synch | Synch | . |
| +79 | Aa1 | −41 | | Aa2 | −43 | | Aa3 | −27 | |
| +80 | Bb1 | −50 | | Bb2 | −41 | | Bb3 | −29 | |
| +100 | Cc1 | −44 | | Cc2 | −48 | | Cc3 | −30 | |
| +160 | Dd1 | −53 | | Dd2 | −50 | | Dd3 | −17 | |
| −181/+179 | Ee1 | −43 | | Ee2 | −36 | | Ee3 | −16 | |
| +180 | Ff1 | −33 | | Ff2 | −38 | | Ff3 | −17 | |

This principle applied to a large number of revolutions in an environment rich in targets and in Fruits makes it possible to establish for each bearing of each SUM, DIFF, CONT pattern of the antenna a mean (or a histogram) over a large number of measurements (accumulation of measurements), ensuring good precision of the antenna patterns on the radar site considered. The above-mentioned large number of revolutions is for example obtained over a day of operation or indeed a week or more according to the expected precision of the patterns and the density of Fruits of the site.

In the case of an antenna of LVA type, this same approach can be undertaken based on slices of elevation of the targets when the altitude of the target is known via the barometric altitude which are transmitted in the synchronous replies. The measurements of the various patterns SUM, CONT and DIFF of the antenna based on elevation slices can thus be performed daily (the time base being for example 24 hours) and broadcast to maintenance services at this tempo.

TABLE 1

| Antenna | 1st Target | | | | 2nd Target | | | | 3rd Target | | | |
|---|---|---|---|---|---|---|---|---|---|---|---|---|
| Azimuth | Bearing | SUM | DIFF | CONT | Bearing | SUM | DIFF | CONT | Bearing | SUM | DIFF | CONT |
| degrees | degrees | dB | dB | dB | degrees | dB | dB | dB | degrees | dB | dB | dB |
| 0 | +100 | −44 | −48 | −30 | +180 | −33 | −38 | −17 | +260 | −47 | −44 | −28 |
| 20 | +80 | −50 | −41 | −29 | | | | | +240 | −47 | −43 | −26 |
| 100 | synchronous | | | | +79 | −41 | −43 | −27 | +160 | −53 | −50 | −17 |
| 150 | −49 | −30 | −47 | −21 | | | | | | | | |
| 180 | | | | | synchronous | | | | | | | |
| 260 | | | | | | | | | synchronous | | | |
| 270 | −168 | −42 | −49 | −16 | | | | | −10 | −28 | −21 | −13 |
| 359 | | | | | −181 | −45 | −36 | −16 | −99 | −47 | −43 | −28 |

Advantageously, the monitoring of the antenna patterns measured from day to day (or indeed on a weekly basis considering that the possible degradation is by nature slow) according to this measurement principle, allows detection of a possible progressive degradation of these patterns, in particular of the deformations of elevational pattern. This deformation of the patterns can make it possible to locate failed radiating elements. A permanent analysis of this deformation makes it possible to alert automatically so as to provide, if necessary, for a repair operation to be scheduled before the performance of the radar deteriorates, in an approach of HUMS ("Health and Usage Monitoring System") type.

The example described with regard to FIGS. 3a to 3f deals with three antenna patterns, SUM, DIFF and CONT. The same principle applies for the four antenna patterns SUM, DIFF, CONT_Front and CONT_Back, like the two patterns SUM, DIFF/CONT.

The decoding of the asynchronous replies, corresponding to the Fruits, is performed like the decoding of the synchronous replies of a conventional radar, in a manner known to the person skilled in the art.

The detection of the replies by a radar according to the invention differs depending on whether these replies are synchronous or asynchronous as summarized by table 3 hereinbelow.

TABLE 3

| Antenna Patterns | Conventional radar Synchronous Reply | Radar according to the invention Synchronous Reply | Asynchronous Reply |
|---|---|---|---|
| | only in listening windows | only in listening windows | permanently |
| SUM | Detects and decodes | Detects and decodes If necessary enriched with the power $P_{SUM}$ | Detects and decodes enriched with the power $P_{SUM}$ |
| DIFF | Locates in SUM lobe (Detects and decodes) | Locates in SUM lobe (Detects and decodes) Enriched with the power $P_{DIFF}$ | Detects and decodes Enriched with the power $P_{DIFF}$ |
| CONT_Front | Rejects if $P_{SUM} <$ $P_{CONT\_Front} +$ parameter | Enriched with the power $P_{CONT\_Front}$ | Detects and decodes Enriched with the power $P_{CONT\_Front}$ |
| CONT_Back | Rejects if $P_{SUM} <$ $P_{CONT\_Back} +$ parameter | Enriched with the power $P_{CONT\_Back}$ | Detects and decodes Enriched with the power $P_{CONT\_Back}$ |

All the replies, synchronous or asynchronous, are enriched with the power measured according to each pattern, regardless of which pattern served to detect and decode it.

Figure 4A:
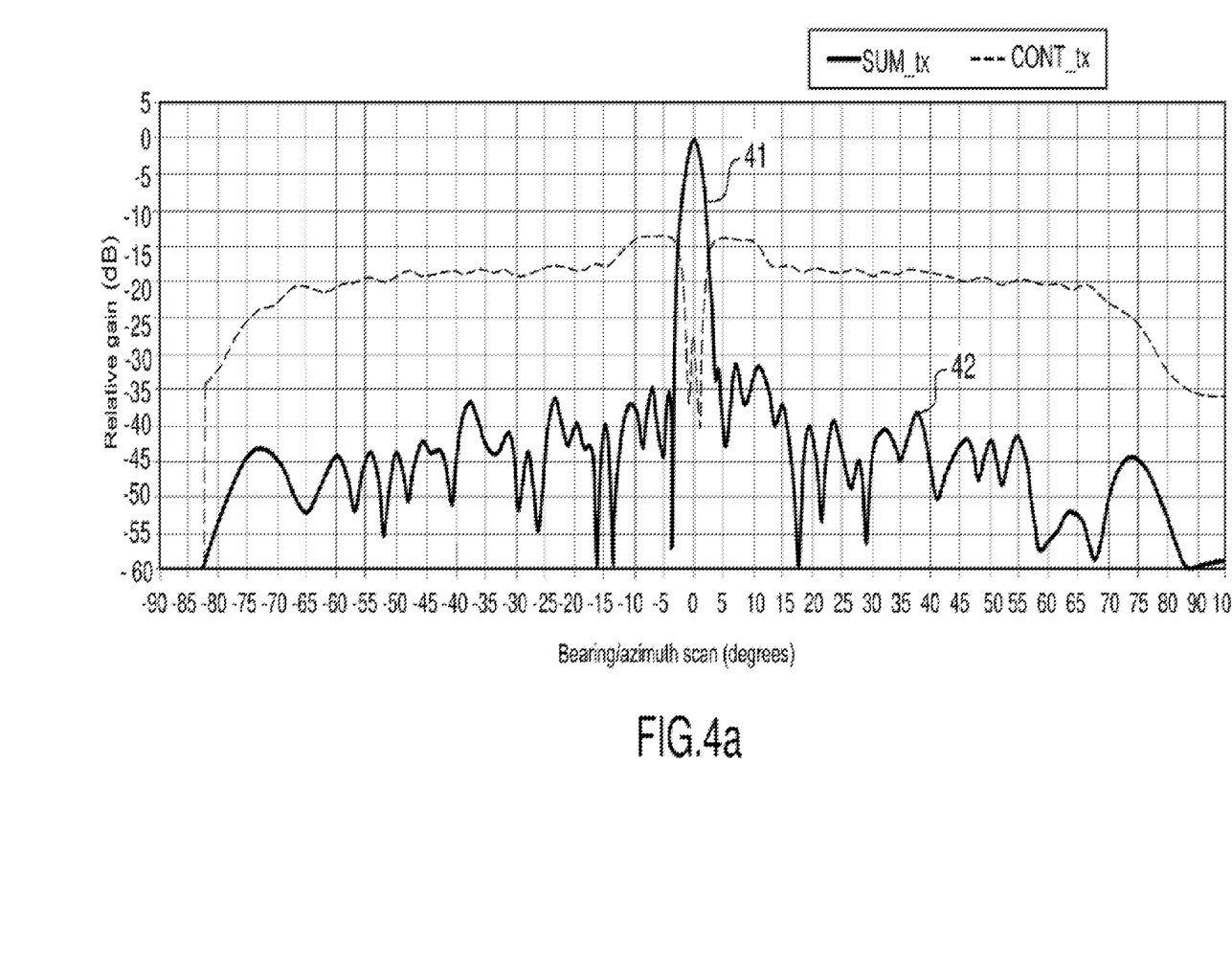
FIGS. 4a and 4b, an illustration of the antenna patterns measurable by the method according to the invention, for an antenna of LVA type typically in the ATC field, respectively for frequencies at 1030 MHz (transmit) and at 1090 MHz (receive)
Figure 4B:
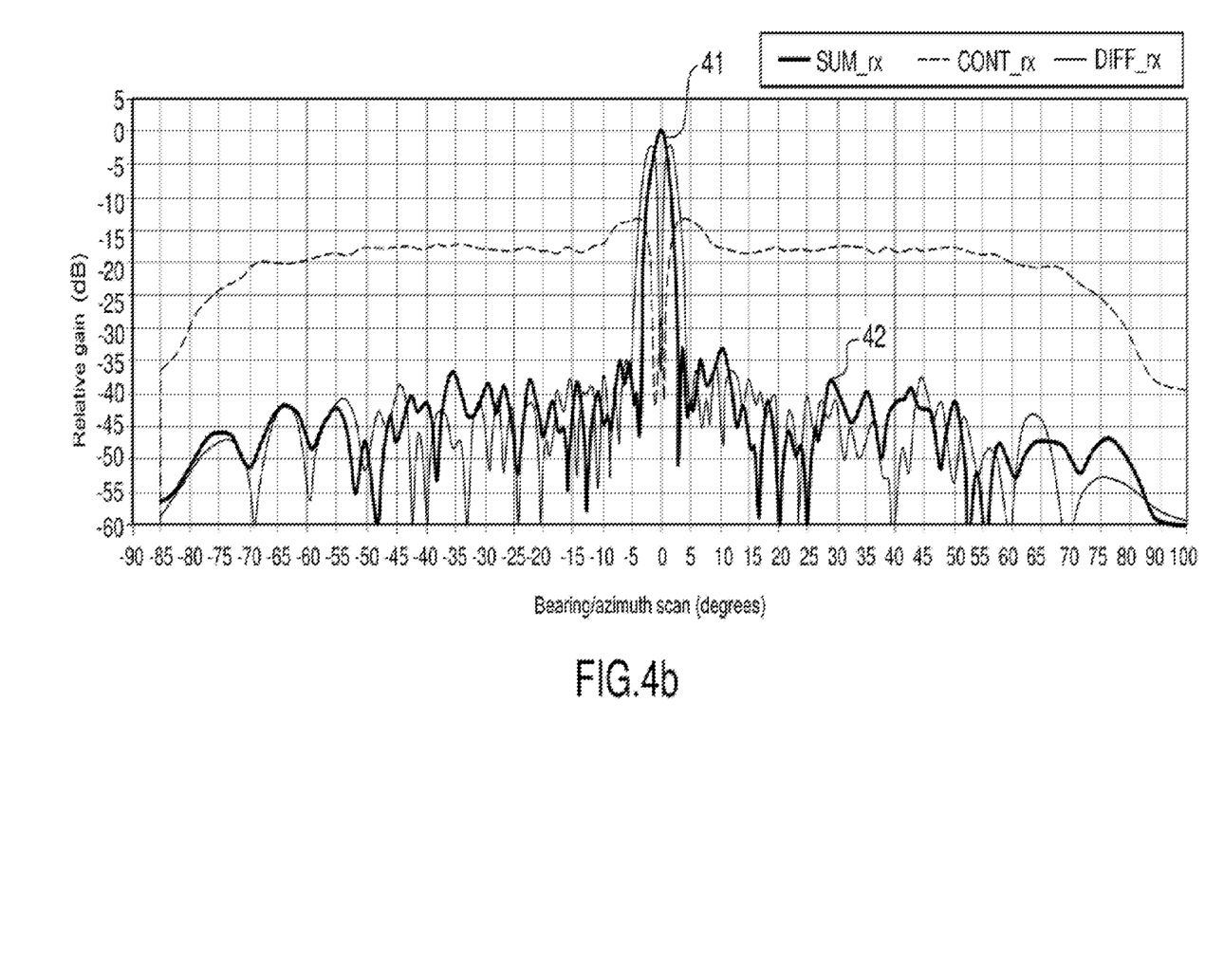

FIGS. 4a and 4b illustrate antenna patterns measurable by the method according to the invention, for an antenna of LVA type in the ATC field, respectively for frequencies at 1030 MHz (transmit) and at 1090 MHz (receive).

The correlation of the amplitude information for the three antenna patterns SUM, DIFF, CONT, associated with the detections of the synchronous and asynchronous Mode S replies makes it possible to construct these patterns based on elevation slices. Moreover, as the same radiating elements of the antenna are used when transmitting and when receiving, this passive analysis when receiving makes it possible to also validate the patterns when transmitting (as shown by the strong similarity between the transmit and receive patterns). This can advantageously be performed throughout the operational utilization of the radar without influencing the functioning thereof and without any external rig.

Figure 5A:
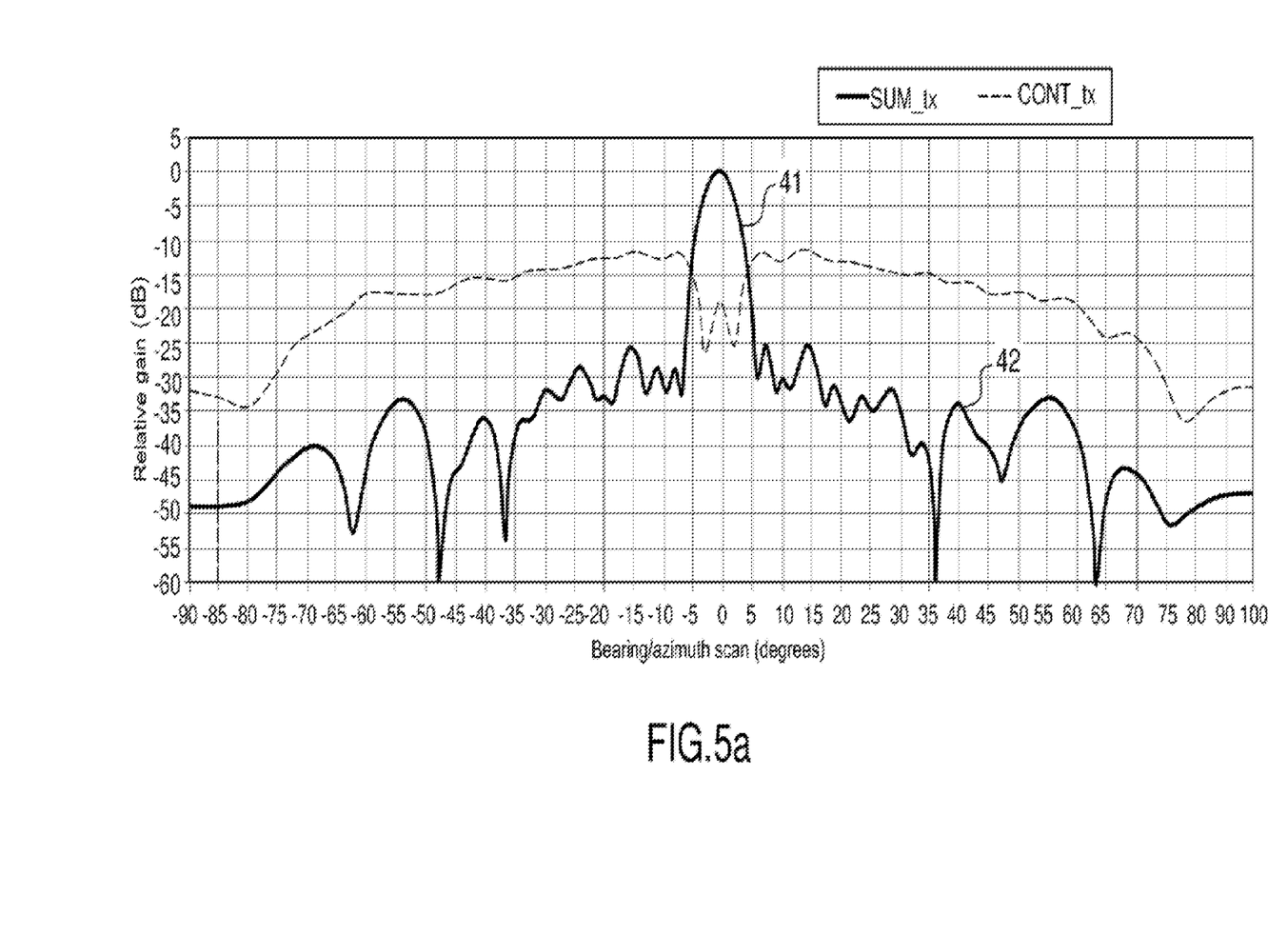
FIGS. 5a and 5b, an illustration of the antenna patterns measurable by the method according to the invention, relating to a boom antenna of smaller dimension typically for an IFF application, respectively for frequencies at 1030 MHz (transmit) and at 1090 MHz (receive).
Figure 5B:
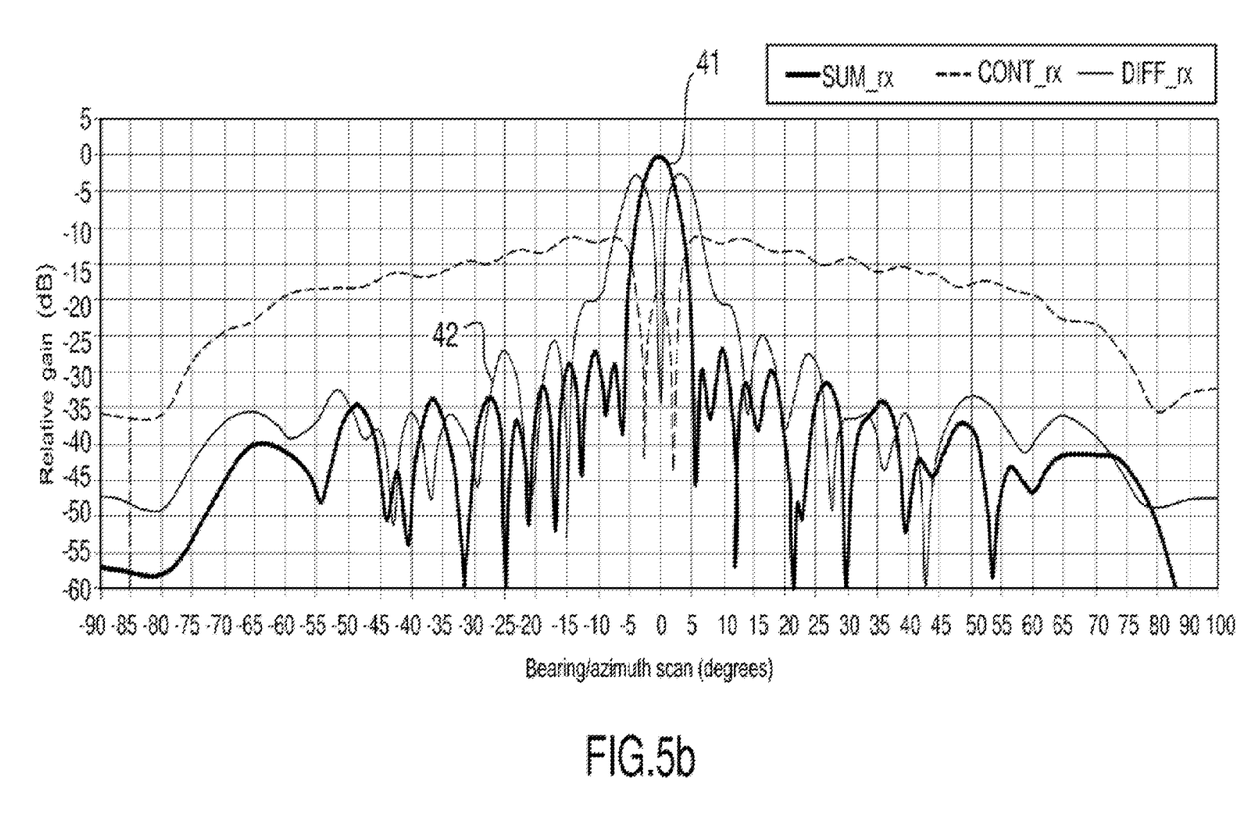

FIGS. 5a and 5b present antenna patterns measurable by the method according to the invention, relating to a boom antenna of smaller dimension for an IFF application, respectively for frequencies at 1030 MHz (transmit) and at 1090 MHz (receive). Again the similarity between the transmit and receive patterns turns out to be significant.

Therefore, for the ATC application as for the IFF application, the similarity between the patterns at 1030 MHz (transmit) and at 1090 MHz (receive) confirms that the processing of the Fruits when receiving makes it possible to detect degradations when transmitting and when receiving over a given period, daily for example, as proposed by the invention.

Moreover, the peak of the sidelobes 42 of the SUM and DIFF patterns being of the order of −25 dB to −35 dB relative to the maximum gain obtained by the main beam 41 of the antenna, the invention proposes to use only the close targets for which the received power level is at least 30 dB above the threshold for detecting and decoding the replies. This makes it possible to represent the maximum of the sidelobes of the SUM and DIFF patterns, thus leading to using only the Fruits for which target is in a radius of 50 Nm around the radar (typical value adjustable by parameter by the operator).

The plots of factory acceptance antenna patterns are made for example with bearing intervals of less than 0.1°. As a consequence of this precision, it is possible to conclude, for the interval of measurement of the antenna patterns according to the invention in an HUMS approach, the following points:

given that the sidelobe upturns occur naturally over several degrees, a precision of the order of 1° can suffice outside of the main lobe;

better precision can be retained in the main lobe, of the order of 0.1°.

These precise details regarding analysis intervals for the patterns are given by way of indication. They can be parametrized by an operator as a function of their requirements in terms of precision, and of the rate of available Fruits of aircraft close to the radar in particular.

The synchronous replies like the asynchronous replies used by a radar according to the invention comprise common characteristics, in particular as regards the detection time, the Mode S address, the antenna azimuth and the powers received on the various patterns SUM, DIFF, CONT_Front and CONT_BACK. The synchronous detections of the radar conventionally take place in tempo with the rotation of the antenna, typically between 4 seconds and 12 seconds. As a general rule, the rate of Fruits in Europe is estimated at several thousand per second, thus leading to estimating a detection of the order of 5 000 to 10 000 Fruits per antenna revolution. This advantageously allows good bearing-wise sampling owing to the asynchronous aspect of the Fruits in relation to the rotation of the antenna. On the other hand, the elevation-wise sampling depends directly on the distribution in distance and altitude of the targets which naturally alters fairly slowly during the flight of the targets, consequently requiring a relatively long duration in order to establish the antenna patterns for various elevation slices.

As regards the synchronous replies acquired at each revolution in the main lobe, in a conventional radar the extractor constructing the blip associates these replies so as to construct the characteristics of the blip and, for certain radars in particular, to define the maximum power received on the nose of the SUM pattern on the basis of the off-aim of the synchronous reply with respect to the axis of the antenna (Off-Boresight Angle, OBA) and of the measured power of the reply.

In the present invention, for each asynchronous reply, the following is calculated:
  its antenna bearing: by extrapolation of the synchronous position of the target azimuth-wise to the Fruit detection time and of the position of the antenna azimuth-wise to the Fruit detection time;
  its relative power (done with respect to the maximum of the sum pathway for the four patterns): by extrapolation of the synchronous power on the SUM pattern of the target temporally bracketing the Fruit detection time to the time of the Fruit and of the power received from the Fruit according to each of the various patterns;
  its elevation: by extrapolation of the synchronous elevation of the target temporally bracketing the Fruit detection time to the time of the Fruit.

Thus, with the powers of the synchronous replies, received by the main beam 41 of the sum pathway (SUM) of the antenna, temporally bracketing the Fruit, the power of the target if it had been in the main beam is estimated at the time of the Fruit and the relative power between the main beam of the antenna of the SUM pattern (maximum gain) and the sidelobes at the bearing of the Fruit is obtained for the four patterns by differencing with the power of the Fruit on each pattern.

According to the invention, for each Fruit $F_{N,i}$ and for each synchronous reply the data hereinbelow (given by way of example) are accumulated in a two-entry table associated with each antenna pattern SUM, DIFF, CONT_Front and CONT_Back:
  in bearing:
    from −180° to −azimuth at −3 dB of the main lobe [typical for ATC to −2.4°] at intervals of 1°;
    from +180° to +azimuth at −3 dB of the main lobe [typical for ATC to +2.4°] at intervals of 1°;
    from (−azimuth at −3 dB) to (+azimuth at −3 dB of the main lobe) [typical for ATC from −2.4° to +2.4°] at intervals of 0.1°;
  in elevation:
    from 0° to 20° at intervals of 1°;
  with the values of the Fruit $F_{N,i}$:
    antenna bearing during Fruit N,I;
    target elevation during Fruit N,I;
  the values of relative power of the antenna patterns:
    Relative SUM power during Fruit N,i;
    Relative DIFF power during Fruit N,I;
    Relative CONT_Front power during Fruit N,I;
    Relative CONT_Back power during Fruit N,i.

Over a very slow period, typically a day, or indeed more depending on the precision desired by the operator in the measurement of the patterns, the following is calculated:
  for each antenna pattern SUM, DIFF, CONT_Front and CONT_Back;
  for each elevation slice;
  for each bearing slice;
the mean of the relative powers accumulated in each cell.

If required, smoothing is performed inside each antenna pattern SUM, DIFF, CONT_Front and CONT_Back by considering the quantity and the quality of the Fruits used to measure each cell of the patterns.

According to the invention, a template of the various antenna patterns SUM, DIFF, CONT_Front and CONT_Back is for example established as a function of the factory plots of the antenna (during factory acceptance) with which the radar site is equipped.

Subsequent to the calculation of the antenna patterns by means of the Fruits, typically each day, the invention compares the measurements performed with the templates in terms of elevation and produces a summary of the out-of-template points, weighting it for example by considering the quantity and the quality of the Fruits used to measure the patterns.

This, for example daily, HUMS summary makes it possible to evaluate a potential ongoing degradation of the antenna patterns.

Moreover, having previously established the characteristic deformation of the antenna patterns as a function of various types of degradation of specific part of the aerial, the invention proposes for example the degraded elements following:
  uniform level loss of the patterns SUM, DIFF, CONT_Front or CONT_Back in terms of bearing and elevation;
    possibly signifying a degradation of the Rotating Joint of SUM, DIFF, CONT_Front or CONT_Back;
    possibly signifying an increase in the losses of the RF cables of SUM, DIFF, CONT_Front or CONT_Back;
  upturn of the SUM, DIFF, CONT_Front or CONT_Back pattern sidelobes at certain bearings, regardless of the elevation;
    possibly signifying a degradation of a radiation column.

Other degraded elements may likewise be highlighted.

This permanent analysis of the four antenna patterns performed with regard to several templates makes it possible to quantify at the functional level a degradation of the performance that could eventually declare the radar or the ADS-B receiver using the same aerial as degraded or indeed faulty.

Beyond the usual templates for guaranteeing performance, dedicated templates can be defined with the aim of detecting the aerial's usual degradations with which the deformations of the antenna patterns will have been associated following these degradations. This then allowing the pre-location of the failed element of the antenna and making it possible to plan its replacement before the radar becomes non-operational.

Advantageously, the method according to the invention is implemented during the operational phases, without generating any dedicated transmission, in a permanent manner and without interfering with the functioning of the radar.

The invention claimed is:

1. A method for measuring antenna patterns in bearing of a secondary radar per elevation slice, said secondary radar comprising an antenna, each antenna pattern being associated with a reception pathway so as to form a sum pattern SUM, a difference pattern DIFF, a first control pattern CONT_front or a second control pattern CONT_back at a given revolution of said antenna, wherein it uses synchronous replies and asynchronous replies, unsolicited of Fruit type, transmitted by targets present in an aerial environment of the radar and detected over a given number of antenna revolutions, at each detection of a reply, the time of the detection, the value of the azimuth of the main beam of the antenna and the value of power received on each of the pathways being associated with the detection, each asynchronous reply being enriched with its bearing, with its relative power per pattern and with its elevation based on a bearing, a relative power per pattern and an elevation of a synchronous reply at the time of the Fruit, said bearing, said relative power per pattern and said elevation of the asynchronous reply obtained over the given number of antenna revolutions being stored, the measured patterns being sampled at various bearings of the antenna on the basis of the stored values.

2. The method according to claim 1, wherein, for each asynchronous reply of a target, the following are calculated:
its antenna bearing: by inferring a synchronous position of the target azimuth-wise at the detection time of the asynchronous reply of Fruit type, and of a position of the antenna azimuth-wise at the detection time of the asynchronous reply of Fruit type;
its relative power: by inferring a power of the synchronous replies, acquired with the main beam of the reception pathway of the SUM pattern of the antenna, of the target temporally bracketing the Fruit detection time of the asynchronous reply of Fruit type at the time of the asynchronous reply of Fruit type and of the power of the asynchronous reply of Fruit type on each of the patterns of the antenna; and
its elevation: by inferring an elevation, received in the synchronous replies, of the target temporally bracketing the detection time of the asynchronous reply of Fruit type at the time of the asynchronous reply of Fruit type.

3. The method according to claim 1, wherein the antenna radiates according to one of the following sets of patterns:
the sum pattern SUM, the difference pattern DIFF, the first control pattern CONT_front for rejecting replies of targets facing the antenna, and the second control pattern CONT_back for rejecting targets to the rear of the antenna;
the sum pattern SUM, the difference pattern DIFF, and a control pattern CONT; and
the sum pattern SUM and a difference and control pattern DIFF/CONT.

4. The method according to claim 1, wherein the replies of Fruit type and the synchronous replies are enriched by characteristics representative of the acquisition of the replies, the characteristics being for each reply at least one of the following characteristics:
power received according to each pattern of the antenna;
time of the detection of the reply; and
azimuth of the main beam of the antenna during the detection.

5. The method according to claim 1, wherein the detection of a reply of Fruit type is enriched by information obtained on the basis of the synchronous replies obtained during the revolutions surrounding the revolution of detection of the reply of Fruit type, this information being at least one of the following characteristics:
relative power of the reply of Fruit type with respect to a maximum of the sum pattern SUM;
bearing of the reply of Fruit type; and
elevation of the reply of Fruit type.

6. The method according to claim 1, wherein over the given number of revolutions, the relative power with respect to a maximum of the sum pattern SUM of a Fruit-type or synchronous reply as a function of the power of the target on the sum pattern are accumulated in tables with two entries, a table being associated with each antenna pattern, one entry being the bearing as a function of the axis of the main lobe of the antenna and one entry being the elevation of the target as a function of the horizontality of the antenna.

7. The method according to claim 6, wherein for a cell (bearing, elevation) of each pattern, the relative power is established by using a mean or a histogram.

8. The method according to claim 1, wherein the antenna is fitted to a secondary radar of the ATC or IFF type.

9. The method according to claim 1, wherein the said antenna is a fixed or rotating electronically scanned antenna.

10. The method according to claim 1, wherein the measurement of the patterns is used to determine an amount of performance degradation of the patterns.

11. A secondary radar, comprising:
an antenna having antenna patterns, each antenna pattern being associated with a reception pathway so as to form a sum pattern SUM, a difference pattern DIFF, a first control pattern CONT_front or a second control pattern CONT_back at a given revolution of said antenna;
means for using synchronous replies and asynchronous replies, unsolicited of Fruit type, transmitted by targets present in an aerial environment of the radar and detected over a given number of antenna revolutions, at each detection of a reply, the time of the detection, the value of the azimuth of the main beam of the antenna and the value of power received on each of the pathways being associated with the detection;
means for enriching asynchronous reply with its bearing, with its relative power per pattern and with its elevation based on a bearing, a relative power per pattern and an elevation of a synchronous reply at the time of the Fruit, said bearing;
means for storing said relative power per pattern and said elevation of the asynchronous reply obtained over the given number of revolutions; and
means for sampling the measured patterns at various bearings of the antenna on the basis of the stored values.

* * * * *

UNITED STATES PATENT AND TRADEMARK OFFICE
CERTIFICATE OF CORRECTION

PATENT NO. : 11,086,006 B2
APPLICATION NO. : 16/203527
DATED : August 10, 2021
INVENTOR(S) : Philippe Billaud Page 1 of 1

It is certified that error appears in the above-identified patent and that said Letters Patent is hereby corrected as shown below:

In the Claims

In Claim 2, Column 13, Line 22, "temporally bracketing the Fruit detection time" should be
-- temporally bracketing the detection time --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*